US005579890A

United States Patent [19]
Harris

[11] Patent Number: 5,579,890
[45] Date of Patent: Dec. 3, 1996

[54] LINEAR/ROTARY ACTUATOR MEMBER

[75] Inventor: Dmitry R. Harris, Wheeling, Ill.

[73] Assignee: Emerson Electric Company, St. Louis, Mo.

[21] Appl. No.: 409,150

[22] Filed: Mar. 23, 1995

[51] Int. Cl.$^6$ ................................................. B65G 17/32
[52] U.S. Cl. .......................................... 198/377; 198/378
[58] Field of Search .................................... 198/375, 377, 198/478.1, 853, 378, 394, 411, 414

[56] References Cited

U.S. PATENT DOCUMENTS

| | | | |
|---|---|---|---|
| 2,359,420 | 10/1944 | Herzog | 74/120 |
| 2,376,161 | 5/1945 | Maud et al. | 198/377 X |
| 2,830,462 | 4/1958 | Vettese | 198/377 X |
| 3,655,020 | 4/1972 | Van Slooten | 192/142 R |
| 4,339,029 | 7/1982 | Wilson | 198/750 |
| 4,435,143 | 3/1984 | Dempsey | 425/150 |
| 4,534,696 | 8/1985 | Ensminger | 414/751 |
| 4,579,517 | 4/1986 | Biggs | 198/377 X |
| 4,761,988 | 8/1988 | Kato | 72/452 |
| 4,911,285 | 3/1990 | Rogall et al. | 198/377 X |
| 5,090,553 | 2/1992 | Focke | 198/377 |
| 5,099,805 | 3/1992 | Ingalls | 123/90.15 |
| 5,121,827 | 6/1992 | Ribordy | 198/377 |
| 5,197,994 | 2/1993 | Hirai et al. | 74/120 |

FOREIGN PATENT DOCUMENTS 1283172  10/1987  U.S.S.R. ................. 198/375

OTHER PUBLICATIONS

SKF Component Systems Co., catalog page, 1992.
SKF Specialty Products Co., catalog page, date unknown.
Machine Design, dated Feb. 21, 1994, advertisement.

*Primary Examiner*—James R. Bidwell
*Attorney, Agent, or Firm*—Tilton, Fallon, Lungmus & Chestnut

[57] ABSTRACT

An actuator member is disclosed in which the actuator member is capable of providing linear and selective rotary movement of the table top of the conveyor member. The actuator member includes a platform housing which can be fixedly attached to conventional conveyor links in a conveyor line, or linear slides. A follower wheel is rotably mounted in the platform housing and includes a table top. The follower wheel is provided with an actuation mechanism for engaging a stationary cam and selectively preventing rotation of the table top or rotating the table top a predetermined radial distance as the conveyor member progresses down the conveyor line. The stationary cam includes dwell portions and index portions which are selectively placed so that, when the actuation mechanism engages the dwell portions, the rotatable table top is not rotated and, when the actuation mechanism engages the index portions, the table top is rotated a predetermined radial distance such as 90°, 180° or some other amount. The inventive actuator member can be used on standard conveyor links and conveyor assemblies or can be used in linear slide mechanisms to provide linear and selective rotary movement of the table top.

27 Claims, 2 Drawing Sheets

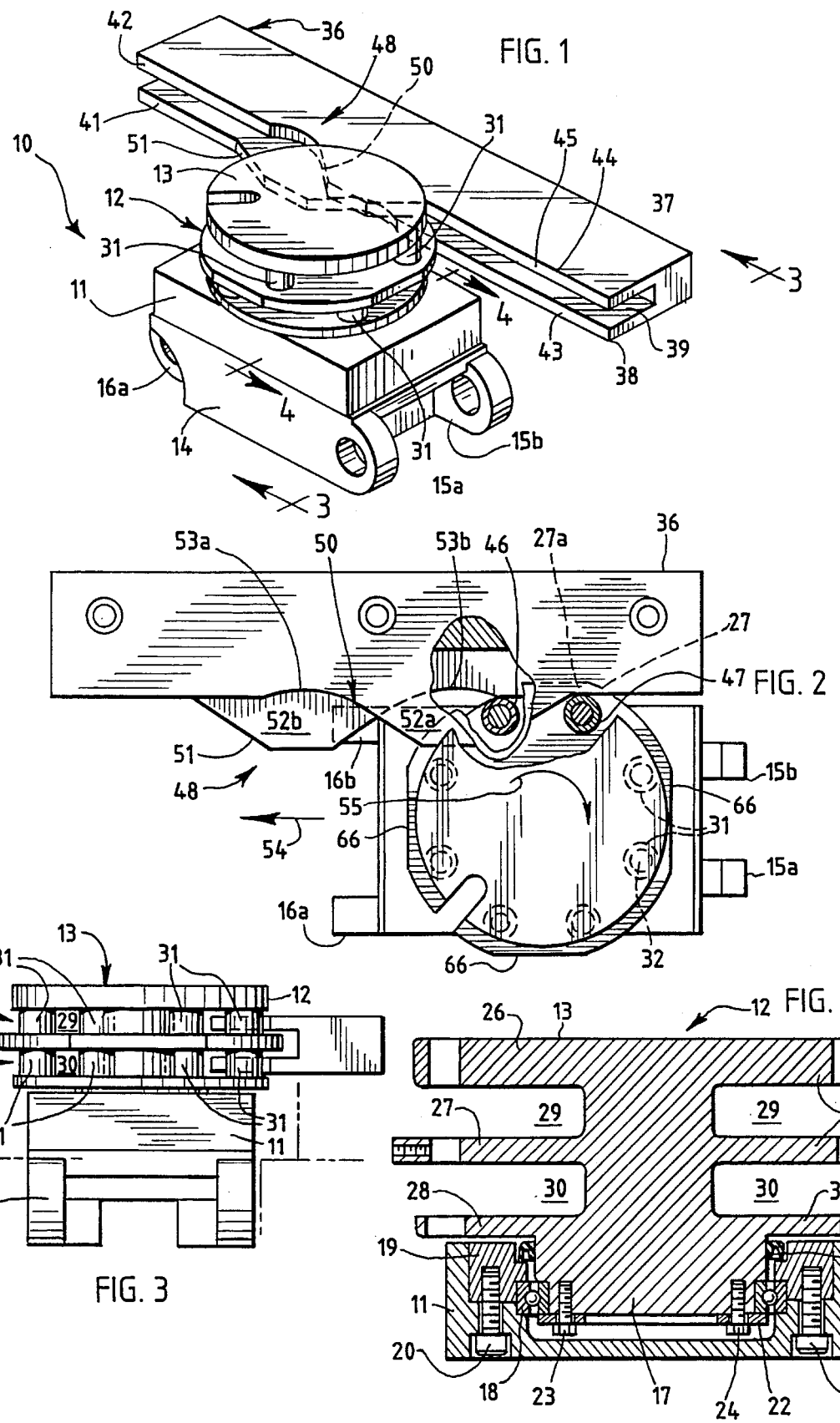

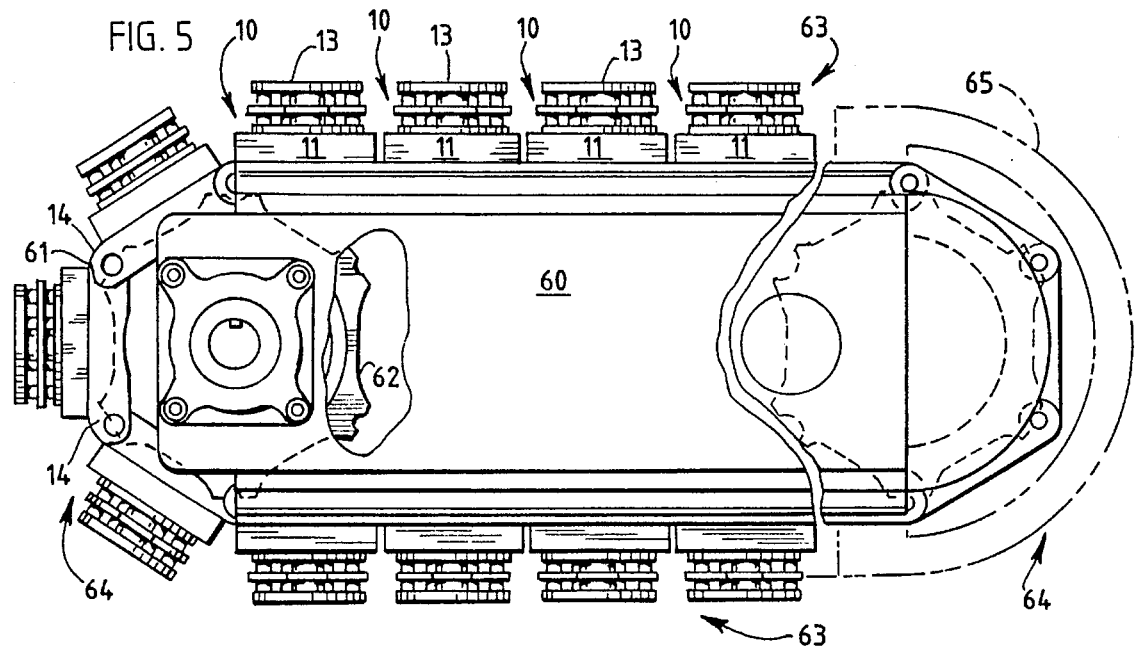
FIG. 5
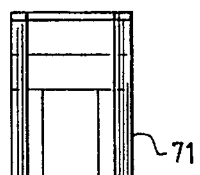
FIG. 6
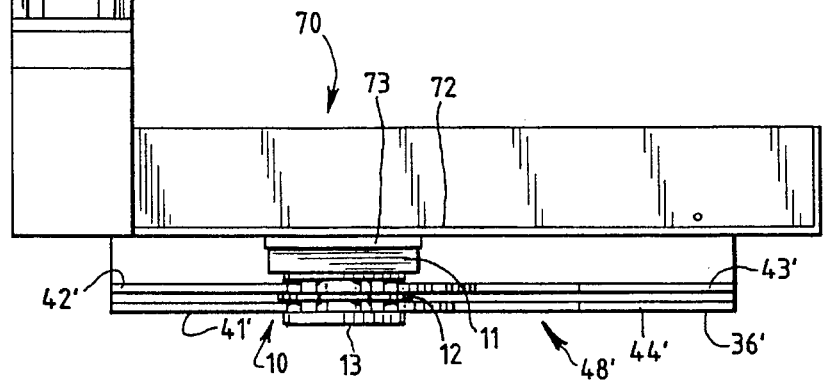
FIG. 7
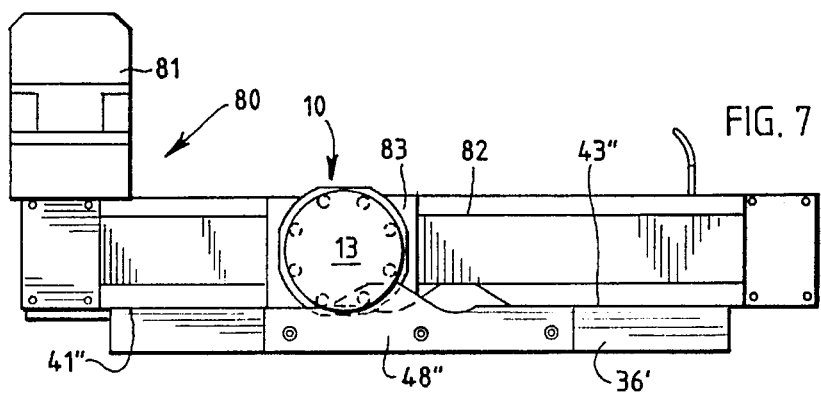

LINEAR/ROTARY ACTUATOR MEMBER

BACKGROUND AND SUMMARY

This invention generally relates to conveyor assemblies and linear slides used in manufacturing assembly lines, and more particularly, to mechanisms of providing linear as well as selective rotary motion for articles which are being conveyed down an assembly line.

Conventional conveyor assemblies typically include a number of conveyor links which are pivotally attached to each other and which follow a linear path along the assembly line. The conveyor links typically include a table top upon which articles are placed for movement down the assembly line. In many operations it is desirable to rotate the article on the table top a predetermined radial distance, such as 90° or 180°, at particular work stations. Prior art systems typically use an external positioning mechanism, such as a robotic arm, which grasps the article, lifts the article off the table top, rotates the article a predetermined radial distance, and then replaces the article back in its original location on the table top. Such external positioning machines are expensive and their use greatly complicates the assembly line process.

An important aspect of this invention therefore lies in providing an actuator member which carries a table top and is capable of providing selective rotary movement of the table top as the actuator member moves in a linear direction along a conveyor line without the need for expensive and cumbersome external positioning machines. The actuator member is attachable to a conventional conveyor link and includes a table top for supporting an article. The actuator member is provided with a follower wheel and actuation means are provided on the follower wheel for engaging a stationary cam and either preventing rotary motion of the table top or rotating the table top a predetermined radial distance. The inventive actuator member is highly advantageous in that it can be retrofitted onto existing conveyor systems and eliminates the need for external positioning machines which have been used in the past.

In brief, the actuator member includes a platform housing which can be attached to a standard conveyor link. A follower wheel is rotably mounted in the housing and includes a table top for supporting an article. The follower wheel is provided with actuation means for engaging a stationary cam and selectively preventing rotation of the table top or rotating the table top a predetermined radial distance as the actuator member progresses down the conveyor line. The stationary cam runs parallel and adjacent to the conveyor line and includes dwell portions and index portions which are selectively positioned for engaging the actuation means and either preventing rotation of the table top when the actuation means engages a dwell portion or rotating the table top a predetermined radial distance when the actuation means engages an index portion.

In one embodiment of the invention, the follower wheel includes an upper disk-shaped plate which includes the table top, a middle disk-shaped plate, and a lower disk-shaped plate. The upper plate is separated from the middle plate by a peripheral slot, and the middle plate is separated from the lower plate by a second peripheral slot. A plurality of rotably mounted cam followers are mounted in the first and second peripheral slots and extend generally in a perpendicular direction with respect to the platform housing. For use with this construction, the stationary cam includes a first cam portion which is positioned to engage the cam followers in the first peripheral slot of the follower wheel and a second cam portion which is positioned to engage the cam followers in the second peripheral slot.

Such a dual level or conjugate cam construction is highly advantageous in that the two levels of engagement between the actuation means and the stationary cam provide smooth rotary motion of the follower wheel with little backlash and provides for greater accuracy in rotating an article a predetermined radial distance than prior art external positioning systems. In the embodiment described in the specification, the index portion comprises a projection member and a concave portion combination provided on the upper stationary cam portion and an oppositely orientated concave portion and projection member provided on the lower stationary cam portion. The cam followers are provided on the follower wheel in pairs in which one of the cam followers is provided in the upper peripheral slot of the follower wheel and the other cam follower is provided in the lower peripheral slot of the follower wheel. Accordingly, when a pair of cam followers engage the upper and lower portion of a rotation cam, one cam follower engages a projection member and the other cam follower engages the concave portion to provide the follower wheel with smooth rotary motion.

The inventive actuator member is usable in different types of conveyor systems which include conveyor means for supporting the actuator member and for moving the actuator member along a path that includes at least one linear path. The stationary cam is mounted so that it extends in a longitudinal direction parallel and adjacent to the linear path of the conveyor means and is provided with selective dwell portions and index portions for affecting the desired movement of the follower wheel and table top. In one embodiment, the conveyor means comprises a continuous conveyor belt formed from a plurality of pivotally connected conveyor links, and each conveyor link is provided with an actuator member which has its platform housing fixedly mounted thereto. The conveyor system includes guide means at the nonlinear portions of the conveyor system for engaging the follower wheels of the actuator members and preventing rotary motion while said actuator members pass through said nonlinear portions of the conveyor system. The follower wheels may be provided with flat portions on the outer peripheral edges of the middle plates of the follower wheels for engaging the guide means.

In another embodiment, the conveyor means may take the form of a linear slide having a shuttle which is positioned to move along a linear path. The actuator member in that case is fixedly mounted to the shuttle for movement along the linear path. The stationary cam is positioned parallel to and adjacent to the linear path and includes dwell and rotation cams for engaging the follower wheel.

Other objects, features, and advantages of the invention will become apparent from the following description and drawings.

BRIEF DESCRIPTION OF THE DRAWINGS

FIG. 1 is a perspective view of the conveyor member and stationary cam embodying this invention.

FIG. 2 is a top, partial fragmentary, plan view of the conveyor member and stationary cam of this invention.

FIG. 3 is a somewhat schematic end view taken along line 3—3 of FIG. 1.

FIG. 4 is a cross-sectional view of the actuator member embodying this invention and is taken along line 4—4 of FIG. 1.

FIG. 5 is a somewhat schematic, partial fragmentary, side view of a conveyor system having a plurality of conveyor members which embody this invention.

FIG. 6 is a side view showing the use of the actuator member of this invention in combination with a linear slide.

FIG. 7 is a top view of the actuator member of this invention used in combination with a linear slide.

DETAILED DESCRIPTION OF THE PREFERRED EMBODIMENT

Referring to the drawings, the numeral 10 generally designates the conveyor member of this invention. Actuator member 10 includes a platform housing 11 and a follower wheel 12 which includes a tabletop 13 for supporting an article (not shown). The housing 11 of actuator member 10 is attached to a conventional conveyor link 14 by suitable attachment means such as conventional dowel rods and threaded fasteners. The conveyor links 14 include attachment members 15a, 15b and 16a, 16b for pivotally securing the conveyor link to an adjacent conveyor link so that a plurality of such conveyor links can be pivotally connected together to form a conveyor belt as shown in FIG. 5. The conveyor links are entirely conventional and are commercially available from the assignee of this application, namely, Commercial Cam Company, Wheeling, Ill. Advantageously, the actuator members of this invention can be retrofitted onto pre-existing conveyor lines which use such conventional conveyor links.

The follower wheel 12 is rotably mounted in the housing 11 so that it is free to rotate. In the specific embodiment illustrated in FIG. 4, follower wheel 12 includes a base 17 which is connected to an annular bearing 18 which in turn is mounted in housing 11. The housing 11 includes an annular bearing cup 19 which is secured to the main portion of the housing by bolts 20 and 21 so that the annular bearing 18 is secured therebetween. Bearing 18 is secured to the base 17 of the follower wheel by an annular bearing retainer 22 which is secured to base 17 by bolts 23 and 24. A grease seal 25 is provided between base 17 and housing 11 for containing lubricants within the housing structure.

In the embodiment shown, the follower wheel 12 includes an upper disk-shaped plate 26 which provides the tabletop 13, a middle disk-shaped plate 27 and a lower disk-shaped plate 28. The upper plate 26 is separated from the middle plate 27 by a first peripheral slot 29, and the middle plate 27 is separated from the lower plate 28 by a second peripheral slot 30.

The follower wheel 12 is provided with actuation means for engaging a stationary cam and selectively preventing rotation of said table top or rotating said table top a predetermined radial distance. In the embodiment given in the illustrations, the actuation means take the form of a plurality of rotably mounted cam followers 31 which extend in a direction perpendicular to the platform housing 11. The cam followers 31 include central shafts 32 which are rotably mounted in holes 33 which are provided in the upper, middle, and lower plates 26, 27 and 28 of the follower wheel 12. As shown most clearly in FIG. 3, a first set 34 of a plurality of cam followers 31 form a first actuation means which is mounted in the first peripheral slot 29 of the follower wheel 12, and a second set 35 of a plurality of cam followers 31 form a second actuation means which is mounted in a second peripheral slot 30. Each set 34 and 35 of followers 31 is positioned to engage select portions of a stationary cam.

In the given illustration, the stationary cam is generally designated with the numeral 36. The stationary cam 36 extends longitudinally and is mounted adjacent to and parallel with a linear path of a selected conveyor system. The stationary cam 36 is positioned so that the actuation means of the follower wheel 12 are brought into engagement with the stationary cam 36. In the particular embodiment illustrated in FIG. 1, the stationary cam 36 includes an upper cam portion 37 and a lower cam portion 38 which define a longitudinal guide slot 39 therebetween. The longitudinal guide slot 39 is positioned to receive a peripheral edge 27a of the middle plate 27 of the follower wheel 11. The stationary cam 36 is further provided with dwell portions designated at 41–44. The dwell portions 41–44 each have a longitudinally-extending flat cam face 45 which is positioned to engage the cam followers 31 of the follower wheel 11 as shown in FIG. 2. Specifically, cam followers 46 and 47 ride along the cam face 45 and prevent the follower wheel 12 from rotating within housing 11. When the cam followers 31 engage the dwell cams 41–44, the tabletop 13 is prevented from rotating and the tabletop 13 moves only in a linear direction along the linear path of a conveyor system.

The stationary cam 36 is also provided with index portions which are generally designated with the numeral 48 and are positioned to engage the cam followers 31 of the follower wheel 12 and cause a predetermined degree of radial rotation of the follower wheel 12 and tabletop 13. In the embodiment shown in FIGS. 1 and 2, the indexing portions 48 include a first index track 50 and a second index track 51 which are respectively provided on the first and second cam tracks 37 and 38. The index track 50 includes a projection member 52a and a concave portion 53a and the index track 51 includes a projection member 52b and a concave portion 53b. The projection member 52a and the concave portion 53a on the upper cam portion 37 have an opposite orientation with respect to the concave portion 53b and projection member 52b on the lower cam portion 38.

Referring to FIG. 2, the operation of the dwell portions 41–44 and the index portions 48 will now be described in connection with the particular embodiment shown in that Figure. The conveyor link 14 and the actuator member 10 are moved along a linear path of a conveyor system in a linear direction designated by the arrow 54. When a pair of cam followers 31 engage the flat face 45 of a dwell portion as illustrated by the pair of cam followers 46 and 47, that engagement prevents the follower wheel 11 from rotating within the housing 11. As the actuator member approaches a position adjacent to the index portion 48, cam follower 47 engages the projection member 52a on the upper cam portion 37 and the other cam follower 46 enters the concave portion 53b of the lower cam portion 38 so that follower wheel 11 rotates in the direction of arrow 55. As shown most clearly in FIG. 1, the cam followers 31 are staggered so that one cam follower 31 is located in the first peripheral slot 29 and the adjacent or next sequential cam follower 31 is located in the lower peripheral slot 30. In this manner, the cooperating projection members 52 and concave portions 53 engage the cam followers 31, such as the pair of cam followers 46 and 47, so as to rotate the follower wheel 12 a predetermined radial distance. In the particular embodiment shown, each index portion 48 consisting of a projection member 52 and a concave portion 53 will cause the follower wheel 12 to rotate approximately 90°. However, it will be understood that the stationary cam may be designed to effect any described, i.e. predetermined, degree of rotation depending upon the desired application.

While a particular construction of a stationary cam 36 including dwell portions 41–44 and index portions 48 have been shown for purposes of illustration, it will be understood that the stationary cam 36 may be provided with any desired combination of dwell portions and index portions so that the actuator member 10 undergoes a desired range of movement including nonrotation of the tabletop 13 and selected rotation of the tabletop 13. Advantageously, the stationary cam 36 may be formed in segments which include dwell or stationary cams so that particular segments can be periodically switched to selectively modify the movement of the actuator member 10 along the conveyor line.

The actuator member 10 of this invention is useful in various types of systems which include conveyor means for supporting the actuator member and moving the actuator member along a conveyor line which includes at least one linear section or path. In the embodiment shown in FIG. 5, the actuator means take the form of a conveyor assembly 60 which includes a plurality of conveyor links 14 which are pivotally connected together to form a conveyor belt generally designated at 61. A actuator member 10 of this invention is fixedly mounted on each of the conveyor links 14. The conveyor assembly 60 includes a conventional drive means generally designated as 62 for rotating the conveyor belt 61.

The conveyor assembly 60 includes linear paths generally designated at 63 and non-linear or curved portions 64. Although the stationary cam is not shown in FIG. 5, the stationary cam 36 previously discussed may be selectively provided adjacent to and parallel with the linear path portions 63 of the conveyor system. Depending upon the particular application, the stationary cam 36 may selectively be provided with dwell portions and index portions at selected positions to provide for selective non-rotary or rotary motion of the follower wheel 11 and tabletop 13 of each of the actuator members 10.

A guide rail 65 (shown only in phantom) may be provided for engaging the peripheral edge 27a of the middle plate 27 of the follower wheels 11 to prevent rotation of the follower wheels 11. The peripheral edge 27a of the middle plate 27 advantageously may include a plurality of flats 66 (see FIGS. 1 and 2) which ride along the guide rail 65 and prevent the follower wheels 11 from rotating while the actuator members 10 pass through the non-linear, portions 64 of the conveyor system.

In FIG. 6, the actuator member 10 of this invention is shown in conjunction with a linear slide 70. The linear slide 70 is conventional and includes a motor 71, a linear track 72, and a shuttle 73. The motor 71 is connected to the shuttle 73 in a conventional manner for moving the shuttle along the guide track 72. A actuator member 10 of this invention is fixedly mounted on the shuttle 73 with suitable connection means such as dowel rods and threaded fasteners (not shown). A stationary cam 36' is mounted adjacent and parallel to the guide track 72 for engaging the follower wheel 11 of the actuator member 10 and providing the cam follower 11 with selective non-rotary or rotary motion. As shown, the stationary cam 36' includes dwell portions generally designated at 41', 42', 43', and 44' and index portions generally designated at 48'.

In FIG. 7, a linear slide assembly 80 is shown which includes a motor 81, a guide track 82, and a shuttle 83. A actuator member 10 of this invention is fixedly mounted on the shuttle 83 and is positioned to engage a stationary cam 36" which runs adjacent to and parallel with the guide track 82. The stationary cam 36" includes dwell portions generally designated at 41" and 43" as well as index portions 48" as previously described herein.

The actuator member of this invention is highly advantageous in that it provides for linear as well as selective rotary movement of a table top and an article supported on a table top as it moves down a conveyor line, a linear slide assembly, or the like type of conveying system. Importantly, the actuator member of this invention eliminates the need for complex, expensive, and cumbersome external positioning systems for rotating articles as they are conveyed down a conveyor line. Further, the actuator members of this invention are compatible with being retrofitted onto preexisting conveyor systems by fixedly mounting the actuator members to the top of conveyor links in the typical conveyor lines or onto shuttles in a typical linear slide assembly.

From the foregoing, it is believed that those skilled in the art will readily appreciate the unique features and advantages of the present invention over previous conveyor systems for providing linear and selective rotary motion to articles being conveyed down a conveyor line. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

I claim:

1. A actuator member for providing linear and selective rotary movement of a table top of the actuator member, said actuator member comprising:

a platform housing;

a follower wheel which is rotably mounted in said housing and includes a table top; and actuation means provided on said follower wheel for engaging a stationary cam and selectively preventing rotation of said table top or rotating said table top a predetermined radial distance.

2. The invention of claim 1 in which said actuation means comprises a plurality of rotably mounted cam followers which are positioned to engage said stationary cam.

3. The invention of claim 2 in which each of said plurality of cam followers is mounted upon a shaft which extends in a direction perpendicular to said platform housing.

4. The invention of claim 1 in which said follower wheel includes an upper disk-shaped plate which includes said table top, a middle disk-shaped plate and a lower disk-shaped plate, said upper plate being separated from said middle plate by a first peripheral slot and said middle plate being separated from said lower plate by a second peripheral slot.

5. The invention of claim 4 in which said actuation means comprises first actuation means mounted in said first peripheral slot and a second actuation means mounted in said second peripheral slot.

6. The invention of claim 5 in which said first and second actuation means each comprise a plurality of rotably mounted cam followers which are positioned to engage, respectively, a first portion of said stationary cam and a second portion of said stationary cam.

7. The invention of claim 6 in which said cam followers are radially staggered between said first and second peripheral slot.

8. The invention of claim 1 in which said follower wheel includes a portion which is connected to an annular bearing which is mounted in the platform housing for facilitating rotation of said follower wheel relative to said platform housing.

9. The invention of claim 1 in which said platform housing is fixedly mounted to a conveyor link.

10. A system for providing linear and selective rotary movement of a table top of a actuator member, said system comprising:

at least one actuator member having a platform housing and a follower wheel which is rotably mounted in said housing and includes a table top;

conveyor means which supports said actuator member for moving said actuator member along a linear path;

a stationary cam which extends in a longitudinal direction parallel and adjacent to said linear path and which includes at least one dwell portion and at least one index portion; and actuation means provided on said follower wheel for engaging said stationary cam and selectively preventing rotation of said table top when said actuation means engages said at least one dwell portion and rotating said table top a predetermined radial distance when said actuation means engages said at least one index portion.

11. The invention of claim 10 in which said actuation means comprises a plurality of rotably mounted cam followers which are positioned to engage said stationary cam.

12. The invention of claim 11 in which each of said plurality of cam followers is mounted upon a shaft which extends in a direction perpendicular to said platform housing.

13. The invention of claim 10 in which said cam follower wheel includes an upper disk-shaped plate which includes said table top, a middle disk-shaped plate and a lower disk-shaped plate, said upper plate being separated from said middle plate by a first peripheral slot and said middle plate being separated from said lower plate by a second peripheral slot.

14. The invention of claim 13 in which said actuation means comprises first actuation means mounted in said first peripheral slot and a second actuation means mounted in said second peripheral slot.

15. The invention of claim 14 in which said first and second actuation means each comprise a plurality of rotably mounted cam followers which are positioned to engage, respectively, a first portion of said stationary cam and a second portion of said stationary cam.

16. The invention of claim 15 in which said cam followers are radially staggered between said first and second peripheral slots.

17. The invention of claim 15 in which said first and second portions of said stationary cam are separated by a longitudinally-extending slot which is positioned to receive a peripheral edge of said middle plate of said follower wheel.

18. The invention of claim 10 in which said dwell portion of said stationary cam comprises a longitudinally-extending substantially flat surface.

19. The invention of claim 10 in which said index portion of said stationary cam comprises a sloped indent and a projection member positioned to engage said actuation means on said follower wheel and cause said follower wheel to rotate a predetermined radial distance.

20. The invention of claim 10 in which said predetermined radial distance is approximately 90°.

21. The invention of claim 10 in which said predetermined radial distance is approximately 180°.

22. The invention of claim 10 in which said conveyor means comprises a continuous conveyor belt formed from a plurality of pivotly connected conveyor links, said at least one actuator member including a plurality of actuator members each fixedly mounted upon one of said plurality of conveyor links.

23. The invention of claim 22 in which said conveyor means further comprises guide means provided at nonlinear portions of the conveyor means for engaging said follower wheels of said plurality of actuator members and preventing rotation of said follower wheels while said actuator members pass through said nonlinear portions of said conveyor means.

24. The invention of claim 23 in which said middle disk-shaped plate of said follower wheels include a plurality of peripheral flats for engaging said guide means.

25. The invention of claim 10 in which said conveyor means comprises a linear slide having a shuttle and said at least one conveyor member is fixedly mounted on said shuttle.

26. The invention of claim 10 in which said follower wheel includes a portion which is connected to an annular bearing which is mounted in said platform housing.

27. An actuator member for providing linear and selective rotary movement of a table top of the actuating member, said actuator member comprising:

a platform housing having a follower wheel rotably mounted therein, the follower wheel including a table top for supporting an article; and actuation means provided on said follower wheel for engaging a stationary cam and selectively preventing rotation of said table top or rotating said table top a predetermined radial distance as said actuator member moves along a linear path of a conveyor system which is adjacent and parallel to said stationary cam.

* * * * *

UNITED STATES PATENT AND TRADEMARK OFFICE
CERTIFICATE OF CORRECTION

PATENT NO. : 5,579,890
DATED : December 3, 1996
INVENTOR(S) : Dmitry R. Harris

It is certified that error appears in the above-indentified patent and that said Letters Patent is hereby corrected as shown below:

Claim 1, Column 6, Line 28, "A" should be ---An---

Claim 10, Column 7, Line 4, "a" should be ---an---

Signed and Sealed this

Eighteenth Day of February, 1997

Attest:

BRUCE LEHMAN

*Attesting Officer*     *Commissioner of Patents and Trademarks*